United States Patent
Sivasubramanian et al.

(10) Patent No.: US 12,547,736 B2
(45) Date of Patent: Feb. 10, 2026

(54) SYSTEM FOR DYNAMIC MOBILE APPLICATION SECURITY ASSESSMENT AND METHOD THEREOF

(71) Applicant: Quixxi Pty Ltd., Sydney (AU)

(72) Inventors: Balaji Sivasubramanian, Tamil Nadu (IN); Ragupathy Balan, Tamil Nadu (IN)

(73) Assignee: QUIXXI PTY LTD., Sydney (AU)

( * ) Notice: Subject to any disclaimer, the term of this patent is extended or adjusted under 35 U.S.C. 154(b) by 16 days.

(21) Appl. No.: 18/787,779

(22) Filed: Jul. 29, 2024

(65) Prior Publication Data
US 2025/0036776 A1  Jan. 30, 2025

Related U.S. Application Data

(60) Provisional application No. 63/515,858, filed on Jul. 27, 2023.

(51) Int. Cl.
*G06F 21/57*  (2013.01)

(52) U.S. Cl.
CPC ...... *G06F 21/577* (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

2023/0091903 A1* 3/2023 Apelbaum .......... H04L 63/1425
                                                    726/22

* cited by examiner

*Primary Examiner* — Brian Whipple
(74) *Attorney, Agent, or Firm* — The Belles Group, P.C.

(57) ABSTRACT

A system and method for dynamic application security testing (DAST) of mobile applications is disclosed. The method includes receiving an application binary file associated with a mobile application, validating the application binary by examining its format, and supporting formats such as ELF, APK, AAB, and IPA. Upon validation, the method involves receiving user-selected vulnerability assessment preferences specific to the binary file type. Based on these preferences, the method determines relevant assessment scripts and launches the application binary in a virtual test environment. The DAST scan engine executes the scripts, recording various activities including user login, logout, registration, and searches. A data processing engine then analyzes these activities to identify vulnerabilities. Finally, the method generates and displays a detailed report of the detected vulnerabilities on the user device.

10 Claims, 5 Drawing Sheets

SYSTEM FOR DYNAMIC MOBILE APPLICATION SECURITY ASSESSMENT AND METHOD THEREOF

CROSS REFERENCE TO RELATED PATENT APPLICATIONS

This U.S. Non-Provisional Patent Application claims the benefit of U.S. Provisional Patent Application No. 63/515,858, filed on Jul. 27, 2023, the entire contents of which are hereby incorporated by reference herein, for all purposes.

FIELD OF THE INVENTION

The present invention relates to testing mobile applications. More particularly, the present invention relates to a system and a method for dynamic mobile application security and assessment.

BACKGROUND

Mobile applications are usually designed to run on smart phones and tablets. Mobile applications are available via various distribution platforms such as Google Play Store®, Microsoft Store®, Amazon Appstore, and Apple® App Store®. They are frequently run by the mobile operating system's creator, a telecommunications provider, the device maker, commercial entities, or industry associations (like Android Developer Groups). Generally, developers produce mobile apps and upload them to an application distribution platform. Users browse the available mobile apps and download the ones they want to use on their smartphones, tablets, or other compatible devices with an operating system that can run the app on their behalf. The mobile application is susceptible to a variety of security threats or have vulnerabilities, or both, that need to be reviewed or tested by the user.

Dynamic application security testing tools available in the market are not capable of performing the full application scan. They use automatic methods to visit a few pages of the applications and generate vulnerability reports. The existing tools do not ensure that all screens in applications are scanned and visited, all endpoints in the application are invoked. Further, the existing tools do not extract sensitive information shared via end points.

The tools available today collect the authentication details from the user, to access the application pages and use tools like monkey test to click on the buttons, and checkbox on the application screens. This does not ensure whether all screens in the application are opened and such an approach cannot verify all endpoints integrated in the application are accessed to assess vulnerabilities related to endpoints. Scans performed by tools today do not extract sensitive information stored inside the user's device, and data left uncleared in the RAM memory. Existing static app analysis has its benefits, but such analysis ensures only the security of application code, third-party libraries, if any, permissions, and platform-related dependencies. However, such analysis does not predict or prevent or detect data vulnerabilities that may be introduced while using the application. Most of the security testers manually set up their environment and verify the vulnerabilities present in the application.

The existing tools, while scanning applications pages, do not verify the implementations of the SSL certificate pinning, whether it can be bypassed using the Frida scripts and also fail to verify the implementation of root detection and whether it can be bypassed by insecure authentication. All these verifications require manual testing. The existing solutions do not provide preferences to users to select the vulnerability/test cases to verify the application.

Therefore, there is a need to provide a system and a method that can overcome or at least mitigate one or more of the above-mentioned problems and limitations.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

In an aspect of the present invention, a method for dynamic mobile application security assessment is provided. The method includes receiving an application binary file associated with a mobile application by a dynamic application security testing (DAST) engine. The application binary indicates an executable file. The method further includes validating the application binary file by examining a format of the application binary based on reading the application binary. The format of the application binary includes one or more of Executable and Linkable Format (ELF), Android Application Package (APK), Android App Bundle (AAB), and iOS app package app store (IPA). The method further includes receiving a selection of a list of vulnerability assessment preferences from a user, based on type of the application binary file, upon the validation of the application binary. The method further includes determining one or more assessment scripts based on the selection of the list of vulnerability assessment preferences. The method further includes launching the application binary in a virtual test environment by the DAST scan engine upon the determination of the one or more assessment scripts such that the one or more assessment scripts are executed. The method further includes recording one or more activities associated with the mobile application by the DAST scan engine. The one or more activities include one or more of user login, user logout, user registration, and searching. The method further includes extracting one or more vulnerabilities by a data processing engine associated with the DAST engine based on the one or more activities associated with the mobile application. The method further includes generating a report displaying the extracted one or more vulnerabilities to the user on the user device.

In another aspect of the present invention, a system for dynamic mobile application security assessment is provided. The system comprises of at least one memory, and a processor associated in communication with the at least one memory is configured to receive an application binary file associated with a mobile application by a dynamic application security testing (DAST) engine. The application binary indicates an executable file. The at least one memory, and the processor associated in communication with the at least one memory is configured to validate the application binary file by examining a format of the application binary based on reading the application binary. The format of the application binary includes at least one of Executable and Linkable Format (ELF), Android Application Package (APK), Android App Bundle (AAB), and iOS app package app store (IPA). The at least one memory, and the processor associated in communication with the at least one memory is configured to receive a selection of a list of vulnerability assessment preferences from a user based on type of the application binary file upon the validation of the application binary.

The at least one memory, and the processor associated in communication with the at least one memory is configured to determine one or more assessment scripts based on the selection of the list of vulnerability assessment preferences. The at least one memory, and the processor associated in communication with the at least one memory is configured to launch the application binary in a virtual test environment by the DAST engine upon the determination of the one or more assessment scripts such that the one or more assessment scripts are executed. The at least one memory, and the processor associated in communication with the at least one memory is configured to record one or more activities associated with the mobile application by the DAST engine, wherein the one or more activities include at least one of user login, user logout, user registration, and searching. The at least one memory, and the processor associated in communication with the at least one memory is configured to extract one or more vulnerabilities by a data processing engine associated with the DAST engine based on the one or more activities associated with the mobile application. The at least one memory, and the processor associated in communication with the at least one memory is configured to generate a report displaying the extracted one or more vulnerabilities to the user on the user device.

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
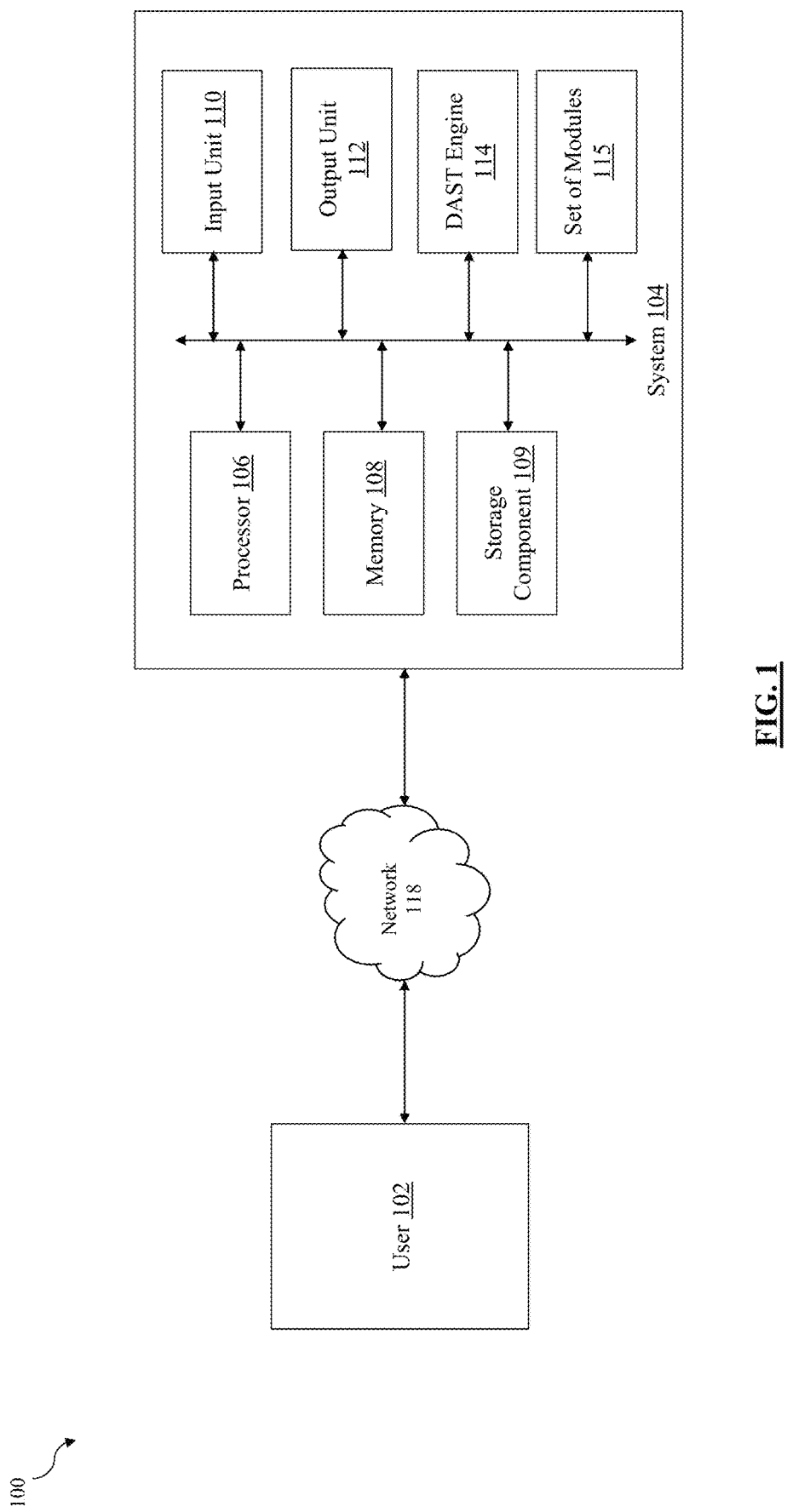
FIG. 1 illustrates an illustrates an environment for an implementation of a system for dynamic mobile application security assessment, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION OF FIGURES

For the purpose of promoting an understanding of the principles of the present disclosure, reference will now be made to the various embodiments and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more elements is required."

Reference is made herein to some "embodiments." It should be understood that an embodiment is an example of a possible implementation of any features and/or elements of the present disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the present disclosure will be described below in detail with reference to the accompanying drawings.

For the sake of clarity, the first digit of a reference numeral of each component of the present disclosure is indicative of the Figure (or "FIG.") number, in which the corresponding component is shown. For example, reference numerals starting with digit "1" are shown at least in FIG. 1. Similarly, reference numerals starting with digit "2" are shown at least in FIG. 2.

Embodiments of the present disclosure disclose a system for achieving a precise orientation of the vehicle. The components of the disclosed system are configured to achieve a precise orientation of the vehicle.

Briefly, according to an exemplary embodiment, disclosed is a method and system for dynamic mobile application security assessment. The system 104 includes an environment 100 that is provided with a description of dynamic application security testing (DAST) scan engine, and data that needs to be processed, stored, recorded, and deleted. The system 104 includes modules/units that perform the operations which are either automatic or manual. This test environment generates vulnerability reports. This test environment will be destroyed once the testing is completed.

The embodiments of the present disclosure are described in detail below:

The terms 'apps', 'mobile application' and 'application' used in the description may have the same meaning and may be used interchangeably. The terms 'DAST search engine', 'DAST scan engine' and 'DAST' used in the description may have the same meaning and may be used interchangeably It is to be noted that the FIG. 1 is explained with respect to a single user, for example the user 102, however, it should be noted that the present disclosure can be similarly applied to multiple users with each of the users allowed to upload and scan the mobile application. Further, the user 102 may communicate with the system 104 using one or more user devices through a network 118. Examples of the user devices include, but are not limited to, a mobile phone, a computer, a tablet, a laptop, a palmtop, a handheld device, a telecommunication device, a personal digital assistant (PDA), and the like. Examples of the network include, but are not limited to, a mobile communication network, a Local Area Network (LAN), a Wireless Local Area Network (WLAN), a Wide Area Network (WAN), internet, a Small Area Network (SAN), and the like FIG. 1 illustrates an environment 100 for an implementation of a system 104 for dynamic mobile application security assessment, according to an embodiment of the present disclosure.

In a non-limiting example, the system 104 may be implemented in any computer server accessible by a user device such as a laptop computer, a desktop computer, mobile phones, tablets, and the like.

In construction, the environment 100 may typically comprise the user device connected to the system 100 for dynamic mobile application security assessment over the network 118. The network 118 may be a cloud connected over an internet or a physical server connected via wires. The system 100 may include a processor 106, a memory 108, input unit 110, an output unit 112, a DAST engine 114, and a set of modules 115. The processor 106, the memory 108, the input unit 110, the output unit 112, the DAST engine, and the set of modules 115 may be connected with each other via a bus 116.

The Processer 106 may include any computing system which includes, but is not limited to, Central Processing Unit (CPU), an Application Processor (AP), a Graphics Processing Unit (GPU), a Visual Processing Unit (VPU), and/or an AI-dedicated processor such as a Neural Processing Unit (NPU). In an embodiment, the processor can be a single processing unit or several units, all of which could include multiple computing units. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 may be configured to fetch and execute computer-readable instructions and data stored in the memory 108. The instructions can be compiled from source code instructions provided in accordance with a programming language such as Java, C++, C #.net, or the like. The instructions can also comprise code and data objects provided in accordance with, for example, the Visual Basic™ language, LabVIEW, or another structured or object-oriented programming language. In another embodiment, the processor 106 may be configured to control the processing of the input data in accordance with a predefined operating rule or artificial intelligence (AI) model stored in the non-volatile memory and the volatile memory. The predefined operating rule or artificial intelligence model is provided through training or learning algorithms which include, but are not limited to, supervised learning, unsupervised learning, semi-supervised learning, or reinforcement learning.

The memory 108 includes a non-transitory computer readable medium. The memory 108 includes a random-access memory (RAM), a read only memory (ROM), and/or another type of dynamic or static storage device (e.g., a flash memory, a magnetic memory, and/or an optical memory) that stores information and/or instructions for use by processor 106. The memory 108 comprises machine-readable instructions which are executable by the processor 106. The machine-readable instructions when executed by the processor 106 cause the processor 106 to perform one or more method steps of an embodiment described above.

The storage component 109 may be configured to store information and/or software related to the operation and use of the user device. For example, the storage component 109 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input unit 110 may be configured to receive information, such as a user input. For example, the input component 110 may include, but not be limited to, a touch screen display, a keyboard, a keypad, a mouse, a button, a switch, and/or a microphone.

The output unit 112 may be configured to convey information from the system 104 to the user 102 or other systems, utilizing a variety of devices and technologies tailored to specific application needs. The output unit 112 may include visual output devices such as display screens (LCD, LED, OLED), projectors, and heads-up displays (HUDs) for presenting graphical or textual information. Additionally, auditory output through speakers and headphones provides audio feedback and alerts, while haptic output devices, like vibration motors in smartphones or game controllers, offer tactile feedback. Functionally, the output component serves multiple roles, including displaying graphical user interface (GUI) elements for user interaction, delivering notifications and alerts through sound, visual indicators, or vibrations, and rendering complex data visualizations like charts and graphs for easier comprehension.

In an embodiment, the output unit 112 may be configured to receive processed data from the processor 106, which determines the information to be communicated, and it may access memory 108 and storage component 109 to retrieve and display stored information such as documents, media files, or application states. Furthermore, the output unit 112 may be configured to meet specific requirements of different applications, such as high-resolution visual output and immersive audio for gaming systems or clear and precise data visualization and alert mechanisms for industrial control systems. Through these varied output methods, the output unit 112 ensures effective communication of information, enhancing both system functionality and user experience.

The set of modules 115, processes, systems, and devices can be implemented as a single processor or as a distributed processor. Also, the processes, the set of modules 115, and sub-modules described in the various figures of and for embodiments herein may be distributed across multiple computers or systems or may be co-located in a single processor or system. Further, the set of modules 115 may be implemented in hardware, instructions executed by the processor 106, or by a combination thereof. In an embodiment of the present disclosure, the set of modules 115 may be machine-readable instructions (software) which, when executed by a processor 106, perform any of the described functionalities. In an embodiment, the set of modules 115 may include a receiving module 302, a validating module 304, a determining module 306, a launching module 308, a recording module 310, an extracting module 312, and a generating module 314. The receiving module 302, the validating module 304, the determining module 306, the launching module 308, the recording module 310, the extracting module 312, and the generating module 314 may be in communication with each other. Exemplary structural embodiment alternatives suitable for implementing the modules, sections, systems, means, or processes described herein are provided below.

The DAST scan engine 114 may be configured to perform dynamic application security testing (DAST) which is a non-functional testing process where one can assess an application using certain techniques and the result of such testing process covers security weaknesses and vulnerabilities present in an application. The DAST testing process may be carried out either in a manual way or by using automated tools. Manual assessment of an application involves human intervention to identify the security flaws which might slip from an automated tool. A detailed explanation about the DAST scan engine 114 will be provided with reference to FIG. 2.

Figure 2:
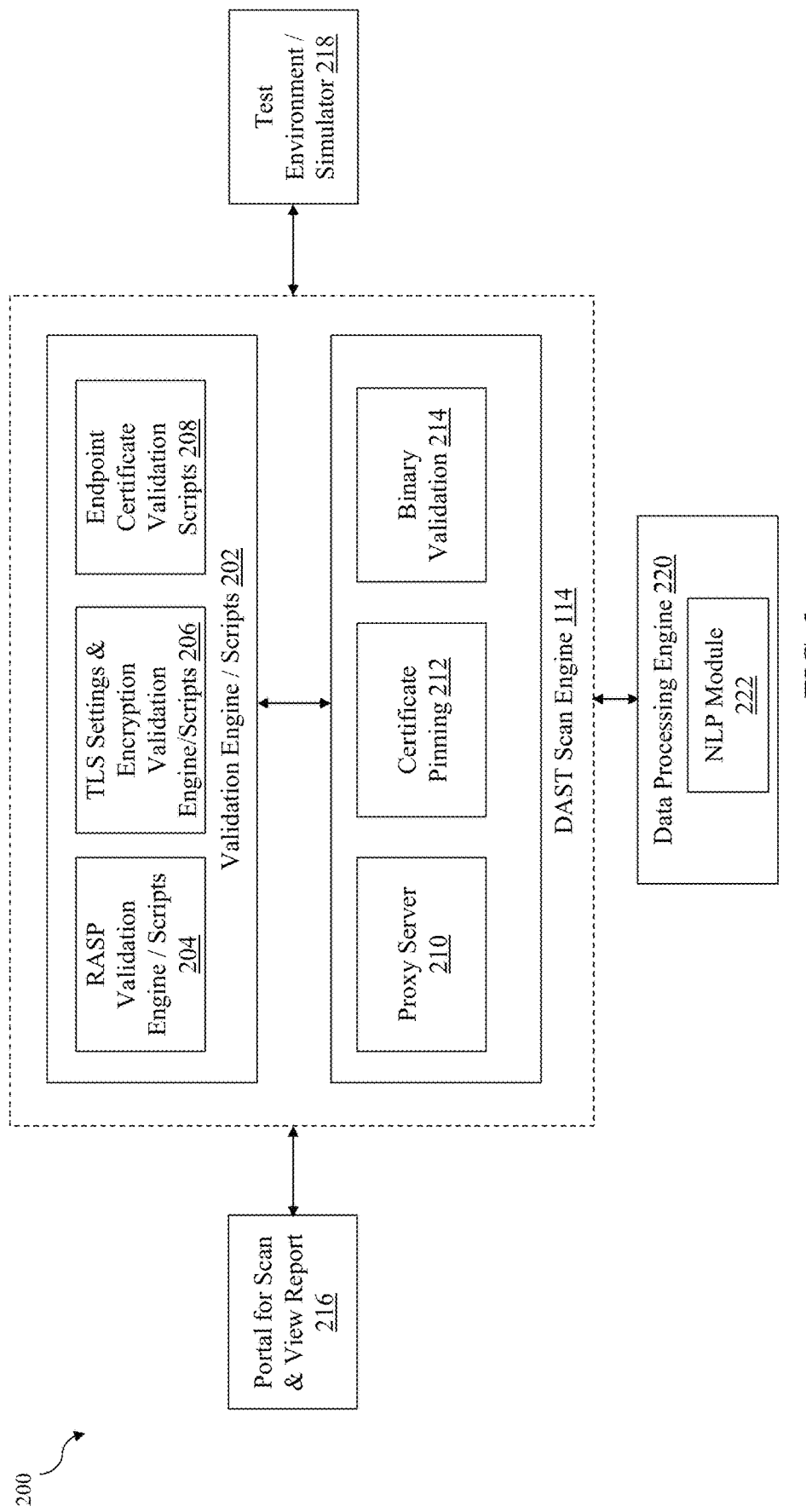
FIG. 2 illustrates a detailed block diagram of the DAST engine of the system, according to an embodiment of the present disclosure.

FIG. 2 illustrates a detailed block diagram 200 of the DAST scan engine 114 of the system 104, according to an embodiment of the present disclosure.

The DAST Scan Engine 114 includes a validation engine 202, further comprising a RASP script 204, a TLS script 206, an end point script 208, a proxy server 210, a certificate pinning 212, and a binary validation 214. In an embodiment, the functionality and access to information that is discussed hereinafter as being provided by the security assessment may be provided by the user 102. In another embodiment, the functionality and access to the information may be selected automatically by the DAST scan engine 114.

The DAST scan engine 114 may be configured to perform dynamic application security testing (DAST) which is a non-functional testing process where one can assess an application using certain techniques and the result of such testing process covers security weaknesses and vulnerabilities present in an application. This testing process may be carried out either in a manual way or by using automated tools. Further, manual assessment of an application involves more intervention to identify the security flaws and may be prone to errors.

After the test simulator launches the application, the assessment scripts may be configured to run in the background by recording all the activities, that is, number of screens visited, script use, list of vulnerabilities, data saved and shared by application, and all other types of information shared by the application for security assessment.

RASP is a capability of an application to protect itself from runtime attacks. Protection mechanism from runtime attacks includes checking the environment of the application running such as root or jailbreak detection, emulator detection, debugger detection. Additionally, the mechanism may be configured to verify the integrity of the application, protect itself from hooking, etc.

RASP scan engine 114 based on the RASP script 204 may be configured to verify the capability of the application to detect above discussed mechanisms by running the application on different environments such as rooted device, emulator, connecting application with debugger, connecting application with hooking tools etc. RASP scan engine 114 may be configured to prepare a new test environment 218 for the application, install the application on the environment 218, inject scripts to verify the application behavior on the environment 218, observe the behavior of the application and generate the report. The environment 218 is separately prepared for each application and destroy it once the assessment is completed.

At another instance, as per requirements preferred by the user 102, Transport Layer Security (TLS) script 206 is used to test the data transferred over the network, the test may include the encryption algorithm used to transfer the data, TLS settings used for transferring the data. The TLS is a cryptographic protocol that provides Internet communication security. DAST scan engine 114 may be configured to verify the data transferred over the network by capturing all the packets sent and received by the application and it uses a proxy connection to achieve so the DAST scan engine 114 analyses the data sent to the network, wherein the data sent is a plain text data transfer or an encrypted transfer using the https connection. DAST scan engine 114 may be configured to use multiple scripts to analyze the TLS 204 settings used in the encrypted connection. It decrypts the header section of the requests sent from the application and analyzes the encryption settings used when establishing the connection.

In an example, an application may send a request to API, DAST search server present in the DAST scan engine 114. Application uses the HTTPS connection class to establish a connection to this API endpoint. During the initial connection request, the server sends a list of supported encryption protocols, the user 102 chooses one from the list based on the availability of the encryption standards supported by the user 102. TLS_AES_256_GCM_SHA384 is one of the encryption protocols used by the connection.

A system and method to test the encryption algorithms used in the application is disclosed. The encryption algorithms may include testing of weak hashing algorithms used, testing of weak encryption algorithms used, testing of random number generation algorithms used in the application. In one example, an application has a method to encrypt the data entered by the user in the UI (for example email id and phone number), then the encrypted data saved in the internal or external storage of the device. If the algorithm used to encrypt or hash the data is a weak method, then any attacker can easily read them from the internal or external storage of the device. The DAST scan engine 114 may be configured to insert a script on the test environment 218 to hook the methods used for encryption. If the application uses the weak algorithms for encryption, then it will be listed as vulnerability of the application in the report.

At another instance, as per requirements preferred by the user 102, an end point certification script 208 may be selected for security assessment of mobile application. The DAST scan engine 114 may be configured to verify the certificate used on the endpoint (API). The DAST scan engine 114 may be configured to verify the application's capability to validate the certificate issued by the endpoint. There are two types of certificates, certificates issued by an authority called Certifying Authority (CA) and self-signed certificates. Applications can accept three types of certificates, 1. certificate issued by known certifying authorities, 2. self-signed certificates, 3. certificate approved by the user. The DAST scan engine 114 may be configured to validate the application capability to validate all three types of certificates by issuing certificates one by one.

For example, DAST search server present in the DAST scan engine 114 may be used inside the application. If this endpoint is used for critical operations like login, attackers can configure a server with similar API and return always true to bypass the login process. If the application accepts any certificate issued by the end point, attackers easily do the above said MiTM attack by configuring a server with self-signed certificate. The DAST scan engine 114 may be configured to validate each certificate by configuring a separate proxy connection to the application and generate a report if the application accepts the self-signed certificate or user accepted certificate.

Figure 3:
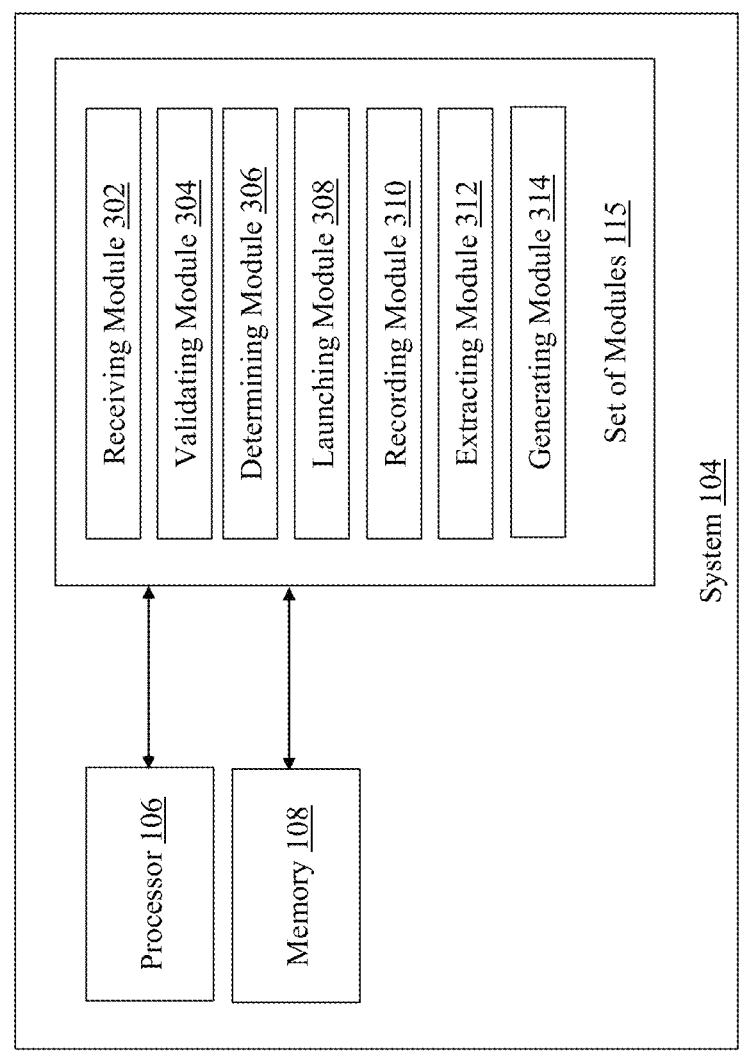
FIG. 3 illustrates a detailed block diagram of the system for dynamic mobile application security assessment, according to an embodiment of the present disclosure.

FIG. 3 illustrates a detailed block diagram 400 of the system 104 for dynamic mobile application security assessment, according to an embodiment of the present disclosure.

In an embodiment of the present disclosure, the receiving module 302 may be configured to receive an application binary file associated with a mobile application by a dynamic application security testing (DAST) engine.

In another embodiment of the present disclosure, the receiving module 302 may be configured to receive a selection of a list of vulnerability assessment preferences from the user 102 based on type of the application binary file upon the validation of the application binary.

In an embodiment of the present disclosure, the validating module 304 may be configured to validate the application binary file by examining a format of the application binary based on reading the application binary.

In an embodiment of the present disclosure, the determining module 306 may be configured to determine one or more assessment scripts based on the selection of the list of vulnerability assessment preferences. The one or more assessment scripts includes RASP validation script 204, TLS setting and encryption validation script 206, and endpoint certificate validation script 208.

In another embodiment, the assessment scripts may be customized based on the user preferences in the list of vulnerability assessment preferences.

In an embodiment of the present disclosure, the launching module 308 may be configured to launch the application binary in a virtual test environment by the DAST engine upon the determination of the one or more assessment scripts such that the one or more assessment scripts are executed.

In an embodiment of the present disclosure, the recoding module 308 may be configured to record one or more activities associated with the mobile application by the DAST engine.

In an embodiment of the present disclosure, the extracting module 310 may be configured to extract one or more vulnerabilities by a data processing engine associated with the DAST engine based on the one or more activities associated with the mobile application.

In an embodiment of the present disclosure, a list of vulnerability assessment preferences may be updated based on feedback from previously generated reports. In another embodiment of the present disclosure, the extracted one or more vulnerabilities may be categorized based on type of vulnerability in the generated report.

In an embodiment of the present disclosure, the generating module 312 may be configured to generate a report displaying the extracted one or more vulnerabilities to the user 102 on the user device.

In an embodiment of the present disclosure, the DAST engine may be integrated with a CI/CD pipeline to enable continuous security testing throughout software development lifecycle.

In an embodiment of the present disclosure, the identifying vulnerabilities is performed by validating application based on rules in the DAST scan engine. In an example, the rule may include natural language processing (NLP) based rules formulated by an NLP engine such as the NLP module 222.

In an example, consider a scenario where a financial technology company is developing a new mobile banking application which uses the Dynamic Application Security Testing (DAST) engine for testing. A user such as the user 102 uploads the compiled application binary file, for example FinSecureBankingApp.apk, to the DAST engine. The uploaded file being an executable file, and the DAST engine reads its format to validate it, recognizing the format of the application binary. Upon successful validation, the user 102 is prompted to select vulnerability assessment preferences. In one example, the user 102 may choose to focus on vulnerabilities related to user authentication and financial transactions, given the sensitive nature of the app. Based on these preferences, the DAST scan engine 114 determines the appropriate assessment scripts. The assessment scripts include tests for common vulnerabilities such as SQL injection, weak encryption, and improper session handling.

Furthermore, the DAST scan engine 114 then launches the FinSecureBankingApp.apk within a virtual test environment, executing the selected assessment scripts. During this testing phase, the DAST scan engine 114 may be configured to simulate various user activities such as logging in, logging out, registering new users, and conducting financial searches. As these activities are performed, the DAST scan engine 114 may be configured to record the behavior of the application, monitoring for any security flaws. The data processing engine 220 may be configured to analyze the recorded activities, identifying several vulnerabilities such as an insecure direct object reference during user registration, a weak password recovery mechanism, and a potential SQL injection vulnerability in the search function.

Finally, the DAST scan engine 114 may be configured to compile the findings into a detailed report. The report, highlighting the identified vulnerabilities, may be presented to the user 102 on their device, providing actionable insights and recommendations for remediation.

Figure 4A:
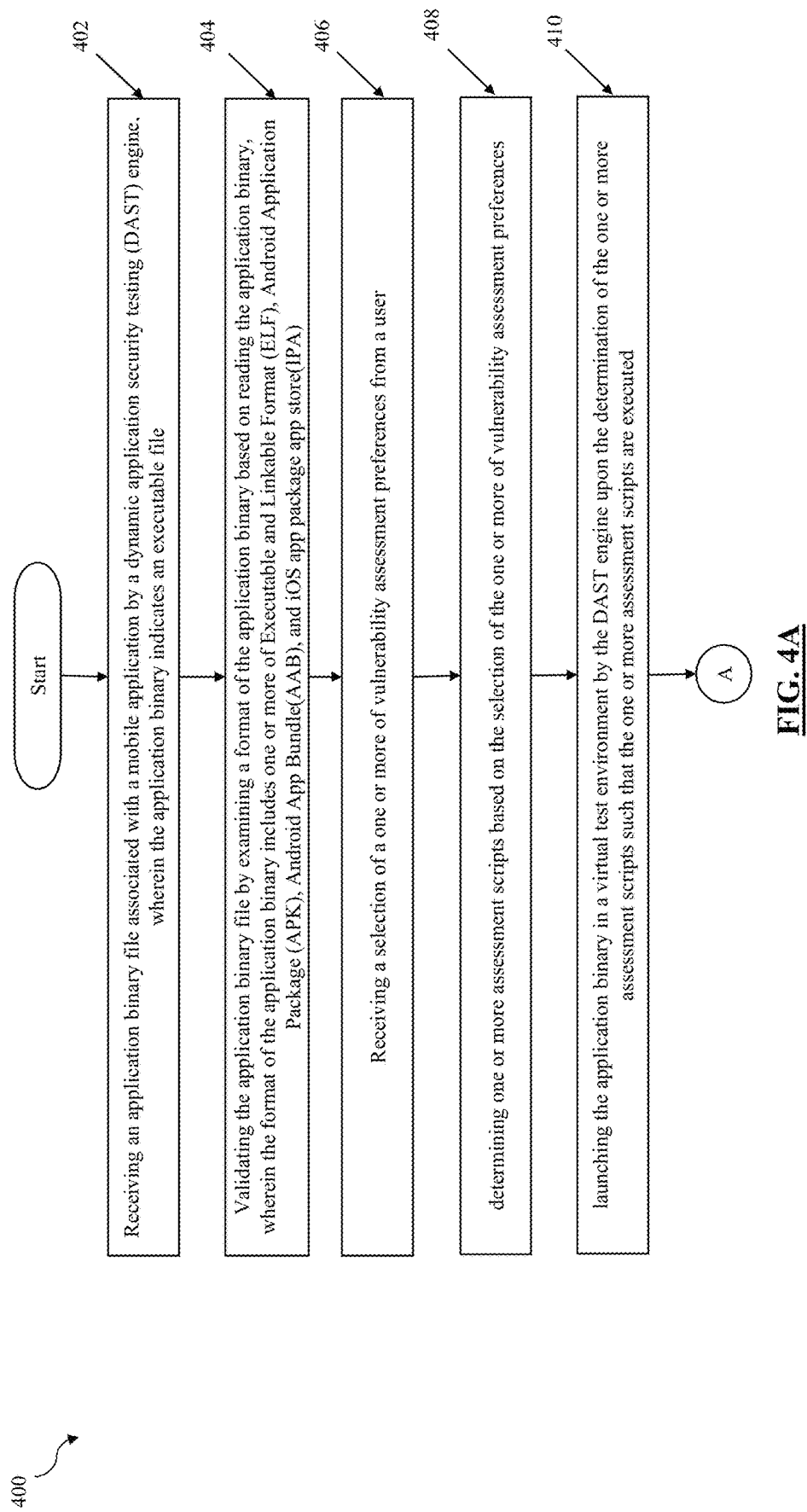
FIG. 4A and FIG. 4B illustrate a flowchart depicting a method for dynamic mobile application security assessment, according to an embodiment of the present disclosure.
Figure 4B:
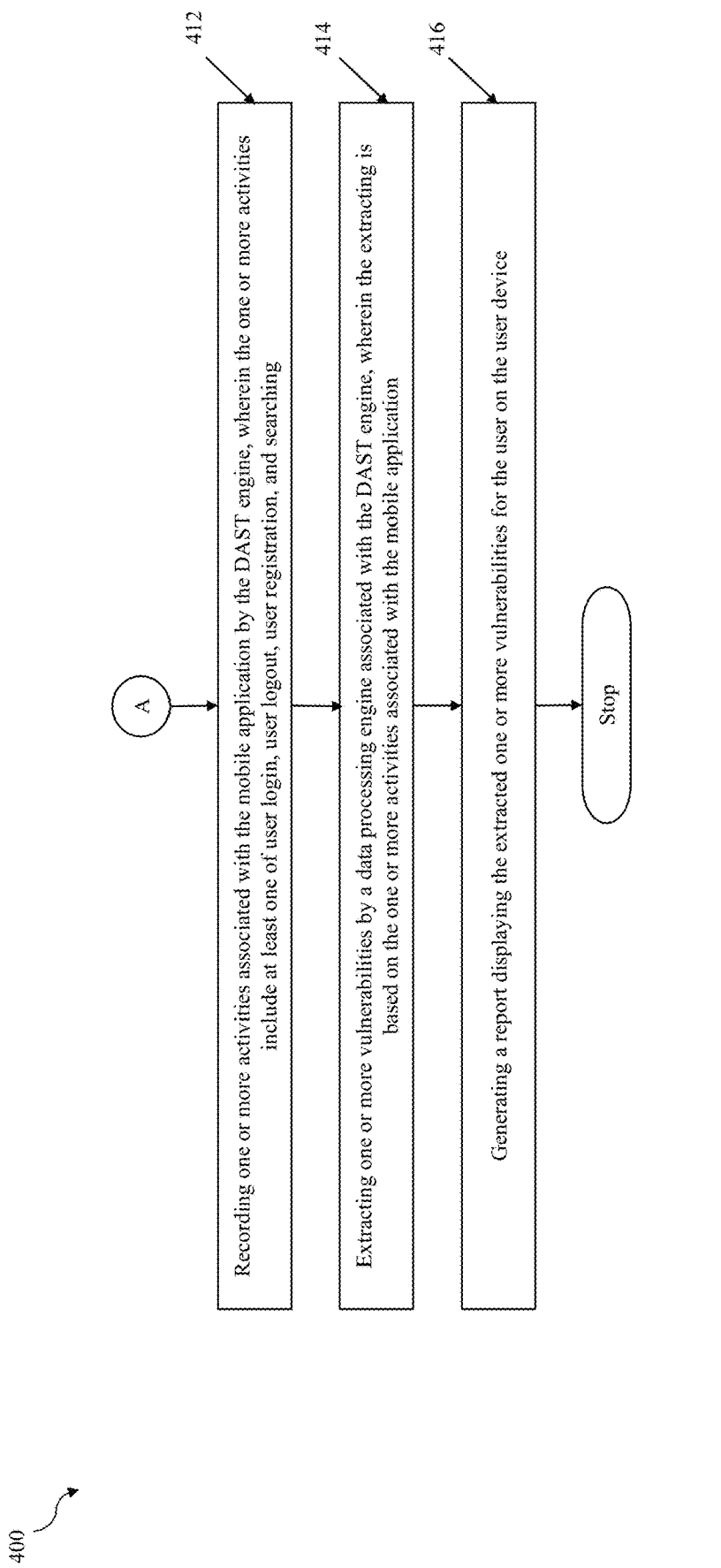

FIGS. 4A and 4B illustrate a flowchart depicting a method 400 for dynamic mobile application security assessment, according to an embodiment of the present disclosure.

The method 400 starts at step 402. At step 402, the method 400 may include receiving an application binary file associated with a mobile application by a dynamic application security testing (DAST) engine. The application binary indicates an executable file.

At step 404, the method 400 may include validating the application binary file by examining the format of the application binary based on reading the application binary. The format of the application binary includes one or more of Executable and Linkable Format (ELF), Android Application Package (APK), Android App Bundle (AAB), and iOS app package app store (IPA).

At step 406, the method 400 may include receiving a selection of a list of vulnerability assessment preferences from a user, based on the type of the application binary file, upon the validation of the application binary.

At step 408, the method 400 may include determining one or more assessment scripts based on the selection of the list of vulnerability assessment preferences.

At step 410, the method 400 may include launching the application binary in a virtual test environment by the DAST engine 114 upon the determination of the one or more assessment scripts such that the one or more assessment scripts are executed.

At step 412, the method 400 may include recording one or more activities associated with the mobile application by the DAST engine 114. The one or more activities include one or more of user login, user logout, user registration, and searching.

At step 414, the method 400 may include extracting one or more vulnerabilities by a data processing engine 220 associated with the DAST engine 114 based on the one or more activities associated with the mobile application.

At step 416, the method 400 may include generating a report displaying the extracted one or more vulnerabilities to the user 102 on the user device.

The disclosed system and method provide significant technical effects and advantages across multiple use cases. Some of them are provided here:
 a. The method (400) supports multiple binary formats, including but not limited to ELF, PE, and Mach-O, enabling comprehensive security validation for a wide range of mobile applications across different operating systems.
 b. The method 400 provides a tailored security assessment that aligns with specific application requirements and user expectations by allowing the user 102 to select vulnerability assessment preferences.
 c. The automated execution of assessment scripts in a virtual test environment 218 streamlines the process of identifying security vulnerabilities, reducing the need for manual intervention and increasing efficiency.
 d. The method 400 records various activities in every page of the application which includes but not limited to user login, logout, registration, and searches, ensuring a thorough examination of application behavior and potential security risks.
 e. The method 400 helps developers or users and security professionals improve the security of mobile applications, protecting users from potential threats by identifying and reporting vulnerabilities.

It will be appreciated that the modules, processes, systems, and devices described above can be implemented in hardware, hardware programmed by software, software instruction stored on a non-transitory computer-readable medium, or a combination of the above. Embodiments of the methods, processes, modules, devices, and systems (or their sub-components or modules), may be implemented on a general-purpose computer, a special-purpose computer, a programmed microprocessor or microcontroller, and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the methods, systems, or computer program products (software programs stored on a non-transitory computer-readable medium).

Furthermore, embodiments of the disclosed methods, processes, modules, devices, systems, and computer program products may be readily implemented, fully or partially, in software using, for example, object or object-oriented software development environments that provide portable source code that can be used on a variety of computer platforms. Alternatively, embodiments of the disclosed methods, processes, modules, devices, systems, and computer program products can be implemented partially or fully in hardware using, for example, standard logic circuits or a very-large-scale integration (VLSI) design. Other hardware or software can be used to implement embodiments depending on the speed and efficiency, or both, requirements of the systems, the particular function, and the particular software or hardware system, or both, microprocessor, or microcomputer being utilized.

In this application, unless specifically stated otherwise, the use of the singular includes the plural, and the use of "or" means "and/or." Furthermore, the use of the terms "including" or "having" is not limiting. Any range described herein will be understood to include the endpoints and all values between the endpoints. Features of the disclosed embodiments may be combined, rearranged, omitted, etc., within the scope of the invention to produce additional embodiments. Furthermore, certain features may sometimes be used to advantage without a corresponding use of other features.

| List of reference numerals: | |
| --- | --- |
| Components | Reference Numerals |
| User | 102 |
| System | 104 |
| Processor | 106 |
| Memory | 108 |
| Storage Component | 109 |
| Input Unit | 110 |
| Output Unit | 112 |
| DAST Scan Engine | 114 |
| Set of Module | 115 |

-continued

List of reference numerals:

| Components | Reference Numerals |
|---|---|
| Validation Engine | 202 |
| RASP Validation Script | 204 |
| TLS Settings & Encryption Validation Engine | 206 |
| Endpoint Certificate Validation Script | 208 |
| Proxy Server | 210 |
| Certificate Pinning | 212 |
| Binary Validation | 214 |
| Portal for scan and view report | 216 |
| Test Environment | 218 |
| Data Processing Engine | 220 |
| NLP Module | 222 |
| Receiving Module | 302 |
| Validating Module | 304 |
| Determining Module | 306 |
| Launching Module | 308 |
| Recording Module | 310 |
| Extracting Module | 312 |
| Generating Module | 314 |

What is claimed is:

1. A method for mobile application security testing, the method comprising:
receiving an application binary associated with a mobile application by a dynamic application security testing (DAST) scan engine, wherein the application binary indicates an executable file;
validating the application binary file by examining a format of the application binary based on reading the application binary, wherein the format of the application binary includes one of an Executable and Linkable Format (ELF), an Android Application Package (APK), an Android App Bundle (AAB), and an iOS app package app store (IPA);
receiving a selection of one or more vulnerability assessment preferences, from a user;
determining one or more assessment scripts based on the selection of the one or more vulnerability assessment preferences;
launching the application binary in a virtual test environment by the DAST scan engine upon the determination of the one or more assessment scripts such that the one or more assessment scripts are executed;
recording one or more activities associated with the mobile application by the DAST scan engine, wherein the one or more activities include one or more of a user login, a user logout, a user registration, and searching;
extracting one or more vulnerabilities by a data processing engine associated with the DAST scan engine, wherein the extracting is based on the one or more activities associated with the mobile application; and
generating a report displaying the extracted one or more vulnerabilities for the user, on the user device.

2. The method as claimed in claim 1, wherein the one or more assessment scripts includes one or more of RASP validation script, TLS setting and encryption validation scripts, and an endpoint certificate validation script.

3. The method as claimed in claim 1, wherein the one or more assessment scripts are customized based on the user preferences in the one or more vulnerability assessment preferences.

4. The method as claimed in claim 1, further comprising:
categorizing the extracted one or more vulnerabilities based on type of vulnerability in the generated report.

5. The method as claimed in claim 1, wherein identifying the one or more vulnerabilities is performed by a validating application based on rules in the DAST scan engine.

6. A system for mobile application security testing, the system comprising:
at least one memory;
a processor in communication with the at least one memory is configured to:
receive an application binary file associated with a mobile application by a dynamic application security testing (DAST) scan engine, wherein the application binary indicates an executable file;
validate the application binary file by examining a format of the application binary based on reading the application binary, wherein the format of the application binary includes one or more of an Executable and Linkable Format (ELF), an Android Application Package (APK), an Android App Bundle (AAB), and an iOS app package app store (IPA);
receive a selection of a one or more vulnerability assessment preferences from a user;
determine one or more assessment scripts based on the selection of the one or more vulnerability assessment preferences;
launch the application binary in a virtual test environment by the DAST scan engine upon the determination of the one or more assessment scripts such that the one or more assessment scripts are executed;
record one or more activities associated with the mobile application by the DAST scan engine, wherein the one or more activities include one or more of a user login, a user logout, a user registration, and searching;
extract one or more vulnerabilities by a data processing engine associated with the DAST scan engine, wherein the extracting is based on the one or more activities associated with the mobile application; and
generate a report displaying the extracted one or more vulnerabilities for the user, on the user device.

7. The system as claimed in claim 6, wherein the one or more assessment scripts includes one or more of RASP validation script, TLS setting and encryption validation scripts, and an endpoint certificate validation script.

8. The system as claimed in claim 6, wherein the one or more assessment scripts are customized based on the user preferences in the one or more vulnerability assessment preferences.

9. The system as claimed in claim 6, the processor in communication with the at least one memory is configured to:
categorize the extracted one or more vulnerabilities based on type of vulnerability in the generated report.

10. The system as claimed in claim 6, wherein identifying the one or more vulnerabilities is performed by a validating application based on rules in the DAST scan engine.

* * * * *